United States Patent [19]
Baum et al.

[11] Patent Number: 5,828,660
[45] Date of Patent: Oct. 27, 1998

[54] MULTIPLE USER COMMUNICATION SYSTEM, DEVICE AND METHOD WITH OVERLAPPING UPLINK CARRIER SPECTRA

[75] Inventors: Kevin Baum, Rolling Meadows; Nikhil S. Nadgauda, Chicago; Roger Laurin Peterson, Inverness; James Robert Kelton, Oakpark, all of Ill.

[73] Assignee: Motorola, Inc., Schaumburg, Ill.

[21] Appl. No.: 639,370

[22] Filed: Apr. 26, 1996

[51] Int. Cl.$^6$ ............................................. H04J 1/02
[52] U.S. Cl. ................................. 370/330; 370/343
[58] Field of Search ................................. 370/203, 208, 370/209, 310, 328, 329, 330, 336, 337, 343, 344, 345, 347, 468, 477, 478, 498, 509, 512; 375/240, 354, 362, 364; 455/31.1, 67.1, 130, 226.1, 226.4, 507, 509, 517, 67.6

[56] References Cited

U.S. PATENT DOCUMENTS

| | | | |
|---|---|---|---|
| 5,012,490 | 4/1991 | Myer | 375/285 |
| 5,140,697 | 8/1992 | Igarashi | 455/54.1 |
| 5,257,404 | 10/1993 | Goreham et al. | 455/51.2 |
| 5,261,118 | 11/1993 | Vanderspool, II et al. | 455/51.2 |
| 5,459,760 | 10/1995 | Watanabe | 375/202 |
| 5,551,066 | 8/1996 | Stillman et al. | 455/69 |

OTHER PUBLICATIONS

"Analysis and Simulation of a Digital Mobile Channel Using Orthoganal Frequency Division Multiplexing", Leonard J. Cimini, Jr IEEE Transactions on communications, vol. Com–33, No. 7, Jul. 1985, pp. 665–675.

"Frequency Synchronization Algorithms for OFDM Systems suitable for Communication over Frequency Selective Fading Channels", Ferdinand Classen, Heinrich Meyer, 1994 IEEE, pp. 1655–1659.

Primary Examiner—Chi H. Pham
Assistant Examiner—Kwang B. Yao
Attorney, Agent, or Firm—Darleen J. Stockley

[57] ABSTRACT

The present invention provides a method, system, subscriber unit, and base/headend unit for a bandwidth efficient multiple user digital communication system that facilitates multiple user reverse link communication using overlapped transmit signal spectra of at least two overlap bandwidth subscriber units. Overlap bandwidth subscriber units receive a forward link signal, each deriving a frequency reference from the forward link signal and a symbol timing reference from the forward link signal, and transmitting a reverse link signal to the base/headend unit that receives a composite reverse link signal of the reverse link signals. Each reverse link signal includes at least one modulated data carrier with distinct carrier frequencies. Each transmitted reverse link signal has a symbol timing responsive to the symbol timing reference, and the frequency spectra of the reverse link signals overlap using overlapped transmit signal spectra of at least two overlap bandwidth subscriber units.

31 Claims, 2 Drawing Sheets

100

200

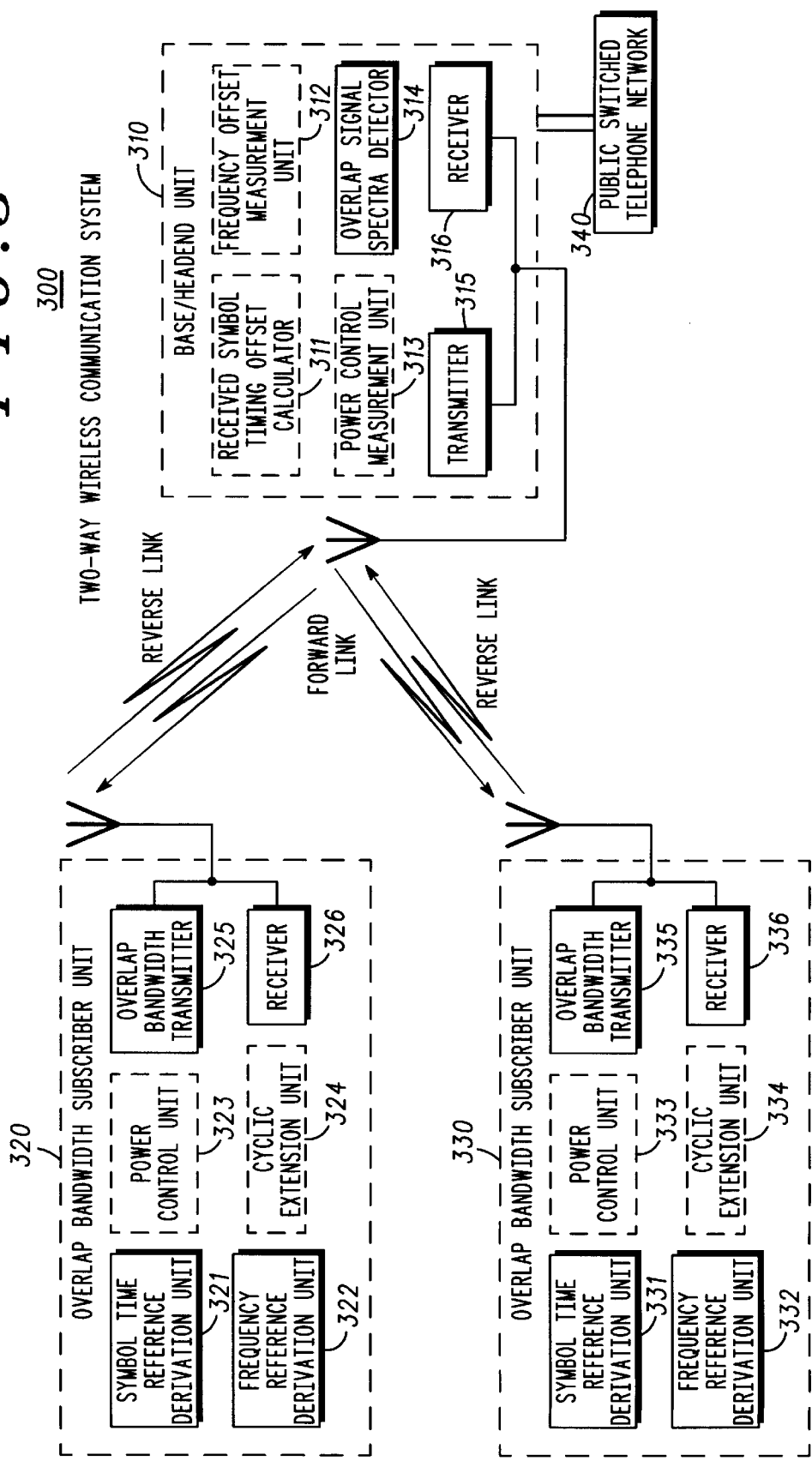

MULTIPLE USER COMMUNICATION SYSTEM, DEVICE AND METHOD WITH OVERLAPPING UPLINK CARRIER SPECTRA

FIELD OF THE INVENTION

The present invention relates generally to communication systems and, in particular, to bandwidth efficient, multiple user two-way communication systems.

BACKGROUND OF THE INVENTION

Communication systems are known to comprise a plurality of subscriber units that communicate with one or more base or headend units via signals communicated over the air or over a wireline network. One such communication system is a two-way wireless communication system. In a two-way wireless communication system, a service access point is provided by a base unit which commonly includes a transmitter and receiver, or transceiver. The base unit may provide connectivity to another network such as the Public Switched Telephone Network, commonly referred to as the PSTN. Remote service connection is provided by a device referred to as a subscriber unit, since service access is often subscription-based. These subscriber units may be mobile transceivers often consisting of handheld "telephone-like" devices which communicate with the base units via the RF spectrum. Each subscriber unit conveys information to the base unit by transmitting a signal to the base unit. The signal transmitted by a subscriber unit to the base unit may be referred to as a reverse link signal, or uplink signal. The base unit conveys information to each subscriber unit by transmitting a signal which may be referred to as a forward link signal, or downlink signal.

As the use of wireless communication systems continues to expand, more of the available RF spectrum is becoming occupied. Therefore, it is desirable for modern communication systems to be bandwidth-efficient. Orthogonal Frequency Division Multiplexing (OFDM) is a method known in the art which allows a high rate digital data stream to be divided into a set of lower rate digital data streams, each of which are modulated onto a separate data carrier signal. The modulated data carrier signals have distinct carrier frequencies, but the carrier frequencies are closely spaced such that the spectra of adjacent modulated data carrier signals have significant overlap, as is known in the art.

Because of good bandwidth efficiency potential and robustness to certain types of channel impairments, OFDM is currently utilized in broadcast and wireline applications, including but not limited to Digital Audio Broadcasting (DAB) and wireline modems. Moreover, OFDM is usable for the forward link of multiple user two-way communication systems. In these applications, the relationship between the multiple modulated data carrier signals can be controlled easily (using the Discrete Fourier Transform, for example) since they are all generated within a single transmitter unit. In the case of DAB, the modulated data carrier signals are generated within a single transmit source, summed, and broadcasted simultaneously. In the case of a communication system forward link, the modulated data carrier signals are generated within a single base unit, summed, and transmitted simultaneously.

A need exists for a multiple user two-way communication system which would enable the use of a bandwidth-efficient spectrally overlapping transmission technique similar to OFDM on the reverse link (subscriber units to base unit or many-to-one), where the multiple modulated data carrier signals do not originate solely from a single transmitter.

BRIEF DESCRIPTION OF THE DRAWINGS

FIG. 3 is a schematic illustrating a multiple-user two-way wireless communication system in accordance with the present invention.

DETAILED DESCRIPTION OF A PREFERRED EMBODIMENT

The present invention provides a two-way communication system which enables the use of bandwidth efficient spectrally overlapping transmissions on the reverse link, where multiple reverse link transmissions occur simultaneously from a plurality of subscriber units, hereafter referred to as overlap bandwidth subscriber units because their reverse link signal frequency spectra may overlap. Simultaneous reverse link transmissions may occur, for example, in a system using a Frequency Division Multiple Access (FDMA) method, or a combined FDMA/TDMA method when multiple subscriber units are transmitting within the same time slot interval.

Mutual interference between the multiple transmitting overlap bandwidth subscriber units is avoided by controlling and coordinating the parameters of the transmit signals from the separate overlap bandwidth subscriber units. By allowing OFDM-like spectrally overlapping transmissions in the reverse link of the two-way communication system, the present invention enables the reverse link of the two-way communication system to obtain bandwidth efficiency similar to that of the forward link of the two-way communication system assuming OFDM is used in the forward link of the two-way communication system.

Figure 1:
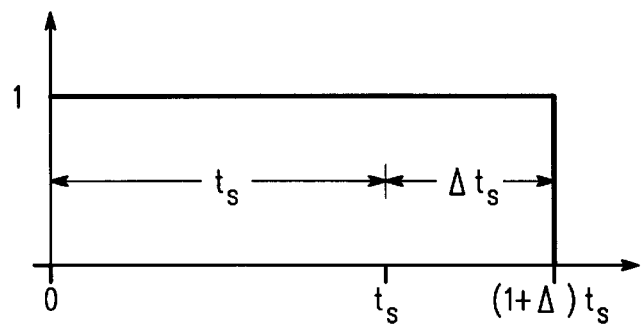
FIG. 1 is a schematic representation of a preferred embodiment of a symbol pulse shape function, $g_x(t)$ utilized by the present invention.

In the present invention, mutual interference among a plurality of transmitting overlap bandwidth subscriber units on an OFDM-like spectrally overlapping reverse link is avoided by controlling and coordinating the parameters of the reverse link transmitted signals. The conditions needed to ensure the avoidance of mutual interference are shown next. Begin by considering the general case of an overlap bandwidth subscriber unit which is transmitting a reverse link signal. The reverse link signal is a digitally modulated signal that includes one or more modulated data carrier signals. A modulated data carrier signal is a carrier which is modulated by a digital information source in the transmitting unit, where the modulation method may comprise M-ary Quadrature Phase Shift Keying (M-PSK), M-ary Quadrature Amplitude Modulation (QAM), or any other digital modulation method which may be known in the art. In OFDM, each of the carriers is commonly referred to as a subcarrier or a tone. A modulated data carrier signal has an associated carrier frequency, symbol time reference, and symbol pulse-shape function. The symbol time reference determines the symbol timing when a reverse link transmission occurs. The pulse-shape function for the modulating symbols on a modulated data carrier signal is selected from any of the known OFDM compatible pulse-shapes. The most common pulse-shape functions have a constant value over the pulse-shape function duration. If the pulse-shape function holds a constant value over the entire pulse-shape duration, the function is commonly referred to as a rectangular pulse-shape function. A preferred embodiment of a pulse shape function, $g_v(t)$, is defined in the following equation and is shown in FIG. 1, numeral 100.

$$g_v(t) = \begin{cases} 1 & 0 \leq t \leq [T_s = (1+\Delta)t_s] \\ 0 & \text{else} \end{cases}$$

In this pulse shape definition, the portion of the pulse shape from 0 to $t_s$ is hereafter referred to the useful symbol portion, and $t_s$ is hereafter referred to as the useful symbol duration. The portion of the pulse shape from $t_s$ to $T_s$ is a symbol extension portion commonly referred to as a cyclic extension, periodic extension, or guard interval. The cyclic extension portion may be placed before the useful symbol portion instead of after the useful symbol portion, in which case it may also be referred to as a cyclic prefix. A cyclic extension is sometimes used in OFDM to improve performance in the presence of a multipath channel.

Consider an OFDM signal based on the defined pulse shape. In a preferred embodiment, this signal may transmitted on a forward link by a single base unit to a plurality of overlap bandwidth subscriber units. The following equation shows an OFDM signal, x(t), based on the defined pulse shape function, $g_v(t)$. The number of subcarriers used for transmission is given by N. Transmitted symbols are given by $X_{k,m}$ and channel attenuation and phase rotation are given by $A(t)e^{j\Phi(t)}$.

$$x(t) = A(t)e^{j\Phi(t)} \sum_{m=-\infty}^{+\infty} \sum_{k=0}^{N-1} X_{k,m} g_v[t-(m-1)T_s] e^{j2\pi k \frac{t}{t_s}}$$

Because all of the modulated data carrier signals comprising the OFDM signal have identical symbol time references and are spaced in frequency by $1/t_s$, any overlap bandwidth subscriber unit is able to detect the data on any of the modulated data carriers without interference from the other modulated data carriers. This detection is performed by integrating the received OFDM signal over a constant time window of length $t_s$. The equation below shows the detection of the $n^{th}$ symbol in time by the $p^{th}$ overlap bandwidth subscriber unit given the reception of the OFDM signal, x(t).

$$\hat{X}_{p,n} = \frac{1}{t_s} \int_{(n-1)T_s}^{(n-1)T_s + t_s} x(t) e^{-j2\pi p \frac{t}{t_s}} dt$$

$$= \frac{1}{t_s} \int_{(n-1)T_s}^{(n-1)T_s + t_s} A(t)e^{j\Phi(t)} \sum_{m=-\infty}^{+\infty} \sum_{k=0}^{N-1} X_{k,m} g_v[t - (m-1)T_s] e^{j2\pi(k-p)\frac{t}{t_s}} dt$$

$$= \frac{1}{t_s} \sum_{k=0}^{N-1} \int_{(n-1)T_s}^{(n-1)T_s + t_s} \sum_{m=-\infty}^{+\infty} A_m e^{j\Phi_m} X_{k,m} g_v[t - (m-1)T_s] e^{j2\pi(k-p)\frac{t}{t_s}} dt$$

$$= \frac{1}{t_s} \sum_{k=0}^{N-1} \int_{(n-1)T_s}^{(n-1)T_s + t_s} A_n e^{j\Phi_n} X_{k,n} e^{j2\pi(k-p)\frac{t}{t_s}} dt$$

$$= \frac{1}{t_s} \int_{(n-1)T_s}^{(n-1)T_s + t_s} A_n e^{j\Phi_n} X_{p,n} dt$$

$$= A_n e^{j\Phi_n} X_{p,n}$$

Figure 2:
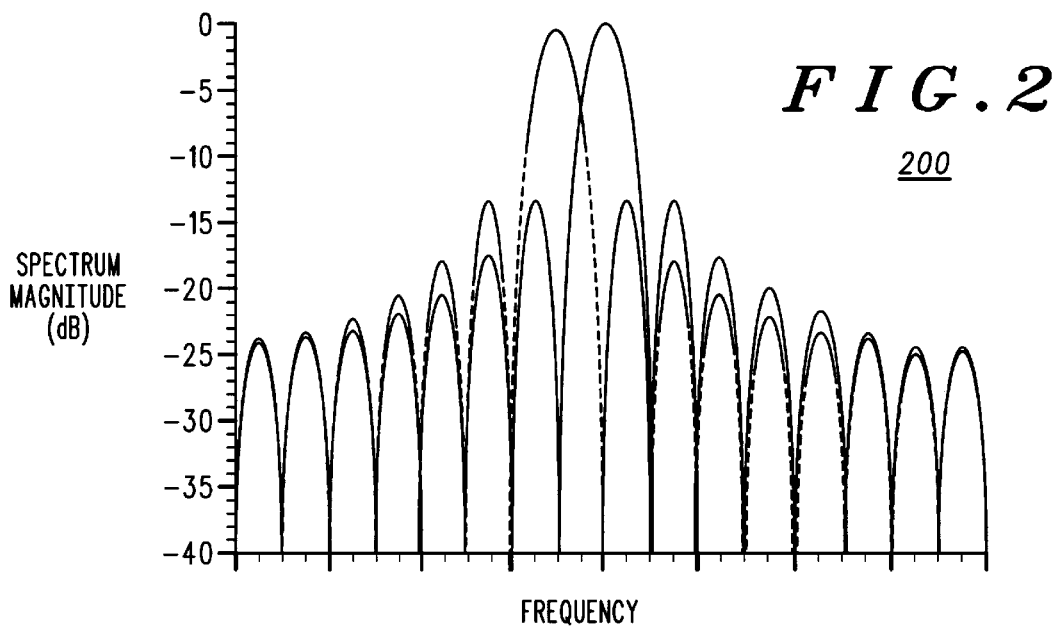
FIG. 2 is a schematic representation illustrating two modulated data carrier signals, with each modulated data carrier signal having a distinct carrier frequency, but with overlapping signal spectra, wherein the modulated data carrier signals are from two separate overlap bandwidth subscriber units, each of which simultaneously transmits a reverse link signal in accordance with the present invention.

Now consider the case where the modulated data carrier signals are from two separate overlap bandwidth subscriber units, each of which simultaneously transmits a reverse link signal that has a modulated data carrier signal, with each modulated data carrier signal having a distinct carrier frequency, but with overlapping signal spectra as shown in FIG. 2, numeral 200. In this case since the overlap bandwidth subscriber units are physically separated, they contain separate local frequency, time, and phase references. These local references are commonly based on a local oscillator contained within each overlap bandwidth subscriber unit. Also note that the attenuation and phase rotation of the second overlap bandwidth subscriber unit reverse link signal may differ from the first due to propagation path differences. A composite signal received at the base unit that includes the sum of the reverse link signals from the two overlap bandwidth subscriber units may be written as shown in the following equation. The portion of the equation identified by k=0 corresponds to the signal transmitted on the first reverse link and the portion of the equation identified by k=1 corresponds to to the signal transmitted on the second reverse link. Time references and local frequency references are represented by $\delta_k$ and $\nu_k$ respectively. Note that any propagation delay differences between the base unit and the two subscriber units are a part of the variable representing the time reference since the equations represent the signals received at the base unit. Attenuations due to the channel are represented by $A_k(t)$ and phase rotations due to either the channel or local phase reference offsets are represented by $e^{j\Phi_k(t)}$.

$$x(t) = \sum_{m=-\infty}^{+\infty} \sum_{k=0}^{1} A_k(t) e^{j\Phi_k(t)} X_{k,m} g_v[t - (m-1)T_s - \delta_k] e^{j2\pi(k+\nu_k)\frac{t}{t_s}}$$

When the base unit attempts to detect the modulated data carrier from the first reverse link, there is generally interference from the second reverse link. This interference is caused by a mismatch between either the time references or the local frequency references of the two overlap bandwidth subscriber units. The following equation shows the detection of the $n^{th}$ symbol transmitted on the first reverse link assuming perfect synchronization of the time references and a mismatch between the local frequency references. Specifically, the two reverse link signals arrive at the base unit with identical symbol timing but are no longer spaced in frequency by an integer multiple of $1/t_s$. Mathematically, $\delta_0=0$, $\delta_1=0$, $\nu_0=0$, and $\nu_1 \neq 0$.

$$X_{0,n} = \frac{1}{t_s} \int_{(n-1)t_s}^{(n-1)T_s S + t_s} x(t)dt$$

$$= \frac{1}{t_s} \int_{(n-1)T_s}^{(n-1)T_s + t_s} \sum_{m=-\infty}^{+\infty} \sum_{k=0}^{1} A(k)(t)e^{j\Phi(t)} X_{k,m} g_v[t-(m-1)T_s] e^{j2\pi(k-\nu_k)\frac{t}{t_s}} dt$$

$$= \frac{1}{t_s} \sum_{k=0}^{1} \int_{(n-1)T_s}^{(n-1)T_s + t_s} \sum_{m=-\infty}^{+\infty} A_{k,m} e^{j\Phi_{k,m}} X_{k,m} g_v[t-(m-1)T_s] e^{j2\pi(k-\nu_k)\frac{t}{t_s}} dt$$

$$= \frac{1}{t_s} \sum_{k=0}^{1} \int_{(n-1)T_s}^{(n-1)T_s + t_s} A_{k,n} e^{j\Phi_{k,n}} X_{k,n} e^{j2\pi(k-\nu_k)\frac{t}{t_s}} dt$$

$$= \frac{1}{t_s} \int_{(n-1)T_s}^{(n-1)T_s + t_s} A_{0,n} e^{j\Phi_{0,n}} X_{0,n} dt + \frac{1}{t_s} \int_{(n-1)T_s}^{(n-1)T_s + t_s} A_{1,n} e^{j\Phi_{1,n}} X_{1,n} e^{j2\pi(1+\nu_1)\frac{t}{t_s}} dt$$

$$= A_n e^{j\Phi_n} X_{0,n} + \frac{1}{t_s} A_{1,nk} e^{j\Phi_{1,n}} X_{1,n} \frac{t_s}{j2\pi(1+\nu_1)} \left[ e^{j2\pi(1+\nu_1)\frac{t}{t_s}} \right]_{(n-1)T_s}^{(n-1)T_s+t_s}$$

$$= A_{0,n} e^{j\Phi_{0,n}} X_{0,n} + A_{1,n} e^{j\Phi_{1,n}} X_{1,n} \frac{1}{j2\pi(1+\nu_1)} \cdot$$

$$\left[ e^{j2\pi\frac{(n-1)T_s+t_s}{t_s}} e^{j2\pi\nu_1\frac{(n-1)T_s+t_s}{t_s}} - e^{j2\pi\frac{(n-1)T_s}{t_s}} e^{j2\pi\nu_1\frac{(n-1)T_s}{t_s}} \right]$$

$$= A_{0,n} e^{j\Phi_{0,n}} X_{0,n} + A_{1,n} e^{j\Phi_{1,n}} X_{1,n} \frac{1}{j2\pi(1+\nu_1)} e^{j2\pi\frac{(n-1)T_s}{t_s}} e^{j2\pi\nu_1\frac{(n-1)T_s}{t_s}} [e^{j2\pi\nu_1} - 1]$$

$$= A_{0,n} e^{j\Phi_{0,n}} X_{0,n} + A_{1,n} e^{j\Phi_{1,n}} X_{1,n} \frac{je^{j2\pi(1+\nu_1)\frac{(n-1)T_s}{t_s}}}{2\pi(1+\nu_1)} [1 - e^{j2\pi\nu_1}]$$

Assuming perfect synchronization between the symbol timing of the signals received at the base unit, the interference term shown above disappears if the mismatch between the local frequency references goes to zero as shown in the following equation:

$$[\hat{X}_{0,n}]_{\nu_1=0} = \left[ A_{0,n} e^{j\Phi_{0,n}} X_{0,n} + \right.$$

$$\left. A_{1,n} e^{j\Phi_{1,n}} X_{1,n} \frac{je^{j2\pi(1+\nu_1)\frac{(n-1)T_s}{t_s}}}{2\pi(1+\nu_1)} [1 - e^{j2\pi\nu_1}] \right]_{\nu_1=0}$$

$$= A_{0,n} e^{j\Phi_{0,n}} X_{0,n} + A_{1,n} e^{j\Phi_{1,n}} X_{1,n} \frac{je^{j2\pi(1+0)\frac{(n-1)T_s}{t_n}}}{2\pi(1+0)} [1 - e^{j2\pi 0}]$$

$$= A_{0,n} e^{j\Phi_{0,n}} X_{0,n} + A_{1,n} e^{j\Phi_{1,n}} X_{1,n} \frac{je^{j2\pi\frac{(n-1)T_s}{t_s}}}{2\pi} [1 - 1]$$

$$= A_{0,n} e^{j\Phi_{0,n}} X_{0,n}$$

The equation below shows the detection of the $n^{th}$ symbol transmitted on the first reverse link assuming perfect synchronization between the two local frequency references and a mismatch between the time references. Specifically, the two reverse link signals arrive at the base unit spaced in frequency by an integer multiple of $1/t_s$, but without identical symbol timing. Mathematically, $\nu_0=0$, $\nu_1=0$, $\delta_0=0$, and $\delta_1 \neq 0$.

$$\hat{X}_{0,n} = \frac{1}{t_s}\int_{(n-1)T_s}^{(n-1)T_s + t_s} x(t)dt$$

$$= \frac{1}{t_s}\int_{(n-1)T_s}^{(n-1)T_s+t_s} \sum_{m=-\infty}^{+\infty}\sum_{k=0}^{1} A_k(t)e^{j\Phi_k(t)}X_{k,m}g_v[t-(m-1)T_s-\delta_k]e^{j2\pi k\frac{t}{t_s}}dt$$

$$= \frac{1}{t_s}\sum_{k=0}^{1}\int_{(n-1)T_s}^{(n-1)T_s+t_s}\sum_{m=-\infty}^{+\infty} A_{k,m}e^{j\Phi_{k,m}}X_{k,m}g_v[t-(m-1)T_s-\delta_k]e^{j2\pi k\frac{t}{t_s}}dt$$

$$= \frac{1}{t_s}\int_{(n-1)T_s}^{(n-1)T_s+t_s}\sum_{m=-\infty}^{+\infty} A_{0,m}e^{j\Phi_{0,m}}X_{0,m}g_v[t-(m-1)T_s]dt +$$

$$\frac{1}{t_s}\int_{(n-1)T_s}^{(n-1)T_s+t_s}\sum_{m=-\infty}^{+\infty} A_{1,m}e^{j\Phi_{1,m}}X_{1,m}g_v[t-(m-1)T_s-\delta_1]e^{j2\pi\frac{t}{t_s}}dt$$

$$= \frac{1}{t_s}\int_{(n-1)T_s}^{(n-1)T_s+t_s} A_{0,n}e^{j\Phi_{0,n}}X_{0,n}dt +$$

$$\frac{1}{t_s}\int_{(n-1)T_s}^{(n-1)T_s+t_s}\sum_{m=-\infty}^{+\infty} A_{1,m}e^{j\Phi_{1,m}}X_{1,m}g_v[t-(m-1)T_s-\delta_1]e^{j2\pi\frac{t}{t_s}}dt$$

$$= A_{0,n}e^{j\Phi_{0,n}}X_{0,n} +$$

$$\frac{1}{t_s}\int_{(n-1)T_s}^{(n-1)T_s+t_s}\sum_{m=-\infty}^{+\infty} A_{1,m}e^{j\Phi_{1,m}}X_{1,m}g_v[t-(m-1)T_s-\delta_1]e^{j2\pi\frac{t}{t_s}}dt$$

Depending on the value of $\delta_1$, the equation for the detection of the of the $n^{th}$ symbol takes on one of three forms.

CASE 1: $-T_s < \delta_1 < -T_s + t_s$ $$\hat{X}_{0,n} = A_{0,n}e^{j\Phi_{0,n}}X_{0,n} +$$

$$\frac{1}{t_s}\int_{(n-1)T_s}^{(n-1)T_s+t_s}\sum_{m=-\infty}^{+\infty} A_{1,m}e^{j\Phi_{1,m}}X_{1,m}g_v[t-(m-1)T_s-\delta_1]e^{j2\pi\frac{t}{t_s}}dt$$

$$= A_{0,n}e^{j\Phi_{0,n}}X_{0,n} +$$

$$\frac{1}{t_s}\int_{(n-1)T_s}^{nT_s+\delta_1} A_{1,n}e^{j\Phi_{1,n}}X_{1,n}e^{j2\pi\frac{t}{t_s}}dt + \frac{1}{t_s}\int_{nT_s+\delta_1}^{(n-1)T_s+t_s} A_{1,n+1}e^{j\Phi_{1,n+1}}X_{1,n+1}e^{j2\pi\frac{t}{t_s}}dt$$

$$= A_{0,n}e^{j\Phi_{0,n}}X_{0,n} +$$

$$\frac{1}{t_s} A_{1,n}e^{j\Phi_{1,n}}X_{1,n}\frac{t_s}{j2\pi}\left[e^{j2\pi\frac{t}{t_s}}\right]_{(n-)T_s}^{nT_s+\delta_1} +$$

$$\frac{1}{t_s} A_{1,n+1}e^{j\Phi_{1,n+1}}X_{1,n+1}\frac{t_s}{j2\pi}\left[e^{j2\pi\frac{t}{t_s}}\right]_{nT_s+\delta_1}^{(n-1)T_s+t_s}$$

$$= A_{0,n}e^{j\Phi_{0,n}}X_{0,n} +$$

$$A_{1,n}e^{j\Phi_{1,n}}X_{1,n}\frac{1}{j2\pi}\left[e^{j2\pi\frac{nT_s}{t_s}}e^{j2\pi\frac{\delta_1}{t_s}} - e^{j2\pi\frac{nT_s}{t_s}}e^{-j2\pi\frac{T_s}{t_s}}\right] +$$

$$A_{1,n+1}e^{j\Phi_{1,n+1}}X_{1,n+1}\frac{1}{j2\pi}\left[e^{j2\pi\frac{nT_s}{t_s}}e^{-j2\pi\frac{T_s}{t_s}}e^{j2\pi} - e^{j2\pi\frac{nT_s}{t_s}}e^{j2\pi\frac{\delta_1}{t_s}}\right]$$

$$= A_{0,n}e^{j\Phi_{0,n}}X_{0,n} +$$

$$A_{1,n}e^{j\Phi_{1,n}}X_{1,n}\frac{je^{j2\pi\frac{nT_s}{t_s}}}{2\pi}\left[e^{-j2\pi\frac{T_s}{t_s}} - e^{j2\pi\frac{\delta_1}{t_s}}\right] +$$

$$A_{1,n+1}e^{j\Phi_{1,n+1}}X_{1,n+1}\frac{je^{j2\pi\frac{nT_s}{t_s}}}{2\pi}\left[e^{j2\pi\frac{\delta_1}{t_s}} - e^{-j2\pi\frac{T_s}{t_s}}\right]$$

CASE 2: $-T_s + t_s < \delta_1 < 0$ $$\hat{X}_{0,n} = A_{0,n}e^{j\Phi_{0,n}}X_{0,n} +$$

$$\frac{1}{t_s}\int_{(n-1)T_s}^{(n-1)T_s+t_s} \sum_{m=-\infty}^{+\infty} A_{1,m}e^{j\Phi_{1,m}}X_{1,m}g_v[t-(m-1)T_s-\delta_1]e^{j2\pi\frac{t}{t_s}}dt$$

$$= A_{0,n}e^{j\Phi_{0,n}}X_{0,n} + \frac{1}{t_s}\int_{(n-1)T_s}^{(n-1)T_s+t_s} A_{1,n}e^{j\Phi_{1,n}}X_{1,n}e^{j2\pi\frac{t}{t_s}}dt$$

$$= A_{0,n}e^{j\Phi_{0,n}}X_{0,n} + \frac{1}{t_s}A_{1,n}e^{j\Phi_{1,n}}X_{1,n}\frac{t_s}{j2\pi}\left[e^{j2\pi\frac{t}{t_s}}\right]_{(n-1)T_s}^{(n-1)T_s+t_s}$$

$$= A_{0,n}e^{j\Phi_{0,n}}X_{0,n} + A_{1,n}e^{j\Phi_{1,n}}X_{1,n}\frac{1}{j2\pi}\left[e^{j2\pi\frac{(n-1)T_s}{t_s}}e^{j2\pi} - e^{j2\pi\frac{(n-1)T_s}{t_s}}\right]$$

$$= A_{0,n}e^{j\Phi_{0,n}}X_{0,n} + A_{1,n}e^{j\Phi_{1,n}}X_{1,n}\frac{1}{j2\pi}\left[e^{j2\pi\frac{(n-1)T_s}{t_s}} - e^{j2\pi\frac{(n-1)T_s}{t_s}}\right]$$

$$= A_{0,n}e^{j\Phi_{0,n}}X_{0,n}$$

CASE 3: $0 < \delta_1 < +t_s$ $$\hat{X}_{0,n} = A_{0,n}e^{j\Phi_{0,n}}X_{0,n} +$$

$$\frac{1}{t_s}\int_{(n-1)T_s}^{(n-1)T_s+t_s} \sum_{m=-\infty}^{+\infty} A_{1,m}e^{j\Phi_{1,m}}X_{1,m}g_v[t-(m-1)T_s-\delta_1]e^{j2\pi\frac{t}{t_s}}dt$$

$$= A_{0,n}e^{j\Phi_{0,n}}X_{0,n} +$$

$$\frac{1}{t_s}\int_{(n-1)T_s}^{(n-1)T_s+t_s} A_{1,n-1}e^{j\Phi_{1,n-1}}X_{1,n-1}e^{j2\pi\frac{t}{t_s}}dt +$$

$$\frac{1}{t_s}\int_{(n-1)T_s+\delta_1}^{(n-1)T_s+t_s} A_{1,n}e^{j\Phi_{1,n}}X_{1,n}e^{j2\pi\frac{t}{t_s}}dt$$

$$= A_{0,n}e^{j\Phi_{0,n}}X_{0,n} +$$

$$\frac{1}{t_s}A_{1,n-1}e^{j\Phi_{1,n-1}}X_{1,n-1}\frac{t_s}{j2\pi}\left[e^{j2\pi\frac{t}{t_s}}\right]_{(n-1)T_s}^{(n-1)T_s+\delta_1} +$$

$$\frac{1}{t_s}A_{1,n}e^{j\Phi_{1,n}}X_{1,n}\frac{t_s}{j2\pi}\left[e^{j2\pi\frac{t}{t_s}}\right]_{(n-1)T_s+\delta_1}^{(n-1)T_s+t_s}$$

$$= A_{0,n}e^{j\Phi_{0,n}}X_{0,n} +$$

$$A_{1,n-1}e^{j\Phi_{1,n-1}}X_{1,n-1}\frac{1}{j2\pi}\left[e^{j2\pi\frac{(n-1)T_s}{t_s}}e^{j2\pi\frac{\delta_1}{t_s}} - e^{j2\pi\frac{(n-1)T_s}{t_s}}\right] +$$

$$A_{1,n}e^{j\Phi_{1,n}}X_{1,n}\frac{1}{j2\pi}\left[e^{j2\pi\frac{(n-1)T_s}{t_s}}e^{j2\pi} - e^{j2\pi\frac{(n-1)T_s}{t_s}}e^{j2\pi\frac{\delta_1}{t_s}}\right]$$

$$= A_{0,n}e^{j\Phi_{0,n}}X_{0,n} +$$

$$A_{1,n-1}e^{j\Phi_{1,n-1}}X_{1,n-1}\frac{je^{j2\pi\frac{(n-1)T_s}{t_s}}}{2\pi}\left[1 - e^{j2\pi\frac{\delta_1}{t_s}}\right] +$$

$$A_{1,n}e^{j\Phi_{1,n}}X_{1,n}\frac{je^{j2\pi\frac{(n-1)T_s}{t_s}}}{2\pi}\left[e^{j2\pi\frac{\delta_1}{t_s}} - 1\right]$$

These three cases for the detection of the $n^{th}$ symbol from the first overlap bandwidth subscriber unit may be summarized as shown below.

$$\hat{X}_{0,n} = A_{0,n}e^{j\Phi_{0,n}}X_{0,n} + \begin{cases} A_{1,n}e^{j\Phi_{1,n}}X_{1,n}\dfrac{je^{j2\pi\frac{nT_s}{t_s}}}{2\pi}\left[e^{-j2\pi\frac{T_s}{t_s}} - e^{j2\pi\frac{\delta_1}{t_s}}\right] + \\ \qquad\qquad\qquad\qquad\qquad\qquad\qquad\qquad\qquad -T_s < \delta_1 < -T_s + t_s \\ A_{1,n+1}e^{j\Phi_{1,n+1}}X_{1,n+1}\dfrac{je^{j2\pi\frac{nT_s}{t_s}}}{2\pi}\left[e^{j2\pi\frac{\delta_1}{t_s}} - e^{-j2\pi\frac{T_s}{t_s}}\right] \\ 0 \qquad\qquad\qquad\qquad\qquad\qquad\qquad\qquad -T_s + t_s < \delta_1 < 0 \\ A_{1,n-1}e^{j\Phi_{1,n-1}}X_{1,n-1}\dfrac{je^{j2\pi\frac{(n-1)T_s}{t_s}}}{2\pi}\left[1 - e^{j2\pi\frac{\delta_1}{t_s}}\right] + \\ \qquad\qquad\qquad\qquad\qquad\qquad\qquad\qquad\qquad 0 < \delta_1 < t_s \\ A_{1,n}e^{j\Phi_{1,n}}X_{1,n}\dfrac{je^{j2\pi\frac{(n-1)T_s}{t_s}}}{2\pi}\left[e^{j2\pi\frac{\delta_1}{t_s}} - 1\right] \end{cases}$$

Assuming that the two reverse link signals arrive at the base unit spaced exactly in frequency by $1/t_s$, the interference term in the above equation disappears as the mismatch in symbol timing approaches zero. Note that the use of a cyclic extension eases the equality requirement for the symbol timing of the two reverse link transmissions. The timing references may differ by an amount as large as the cyclic extension duration. In other words, assuming that the two reverse link signals arrive at the base unit spaced exactly in frequency by $1/t_s$, the requirement on the symbol timing of the second reverse link signal is $-\Delta t_s < \delta_1 < 0$ for it not to interfere with the first reverse link signal.

The above analysis was simplified in that mismatches in timing references and mismatches in local frequency references were examined separately. In other words, either the timing references were set equal and the local frequency references were mismatched, or the local frequency references were set equal and the timing references were mismatched. In reality, both the timing references and the local frequency references need to match in order for the base unit to be able to correctly detect each reverse link signal without interference from the other reverse link signal.

Moreover, while the preceding analysis was shown for a single modulated data carrier from each of two overlap bandwidth subscriber units with a carrier spacing near $1/t_s$, the analysis is also applicable to scenarios with more than two overlap bandwidth subscriber units and carrier spacings near any integer multiple of $1/t_s$.

In order to avoid mutual interference, the local frequency reference and symbol time reference of each overlap bandwidth subscriber unit must be controlled in a predetermined manner by the communication system. The frequency reference requirement is that the modulated data carrier frequencies be spaced by integer multiples of $1/t_s$. The time reference requirement is that all reverse link signals arrive at the base unit with the same symbol timing, which means that the beginning of a received symbol is at the same timing phase relative to a base unit symbol clock regardless of which subscriber unit transmitted the symbol. Note that as the previous equations show, differences in the amplitudes and phase rotations of the reverse link signals arriving at the base unit do not cause interference if the frequency and symbol timing parameters are properly controlled. The prior analysis indicates that a bandwidth-efficient multiple user reverse link may be implemented by utilizing a frequency spacing of as little as $1/t_s$ between the modulated data carriers from separate overlap bandwidth subscriber unit reverse link signals, and that mutual interference can be avoided even though the spectra of the reverse link signals overlap as shown in FIG. 2.

Next the methods for avoiding of mutual interference among a plurality of transmitting overlap bandwidth subscriber units on an OFDM-like spectrally overlapping reverse link are described. To satisfy the time reference requirement, each overlap bandwidth subscriber unit must derive a symbol timing reference from the forward link signal. The symbol timing reference may be derived in an open-loop fashion or a closed-loop fashion. In an open-loop approach, an overlap bandwidth subscriber unit derives a symbol timing reference from the received forward link signal. In a preferred open-loop approach, the overlap bandwidth subscriber unit derives a reverse link symbol timing reference from the symbol timing of the forward link signal. In demodulating the received forward link signal, the overlap bandwidth subscriber unit determines the symbol timing of the received forward link signal using one of the symbol timing recovery methods known in the art. The symbol timing reference derived from the symbol timing of the received forward link signal is then used as a symbol timing reference for the transmission of a reverse link signal by the overlap bandwidth subscriber unit. Note that a subscriber unit contains a local oscillator, as is known in the art, which is used to provide an initial local symbol clock, and that the derived symbol timing reference from the forward link signal may be used to modify the local symbol clock. The overlap bandwidth subscriber unit may optionally advance the symbol timing reference of the reverse link by an amount equal to the signal delay introduced by analog and digital processing chains in the overlap bandwidth subscriber unit transmitter and receiver. Open-loop symbol time reference methods are typically appropriate for geographically small two-way communication systems where propagation delays within the system coverage area are negligible. In order to be considered negligible, the propagation delay must be much smaller than $t_s$, for example less than 1% of $t_s$.

In a closed-loop approach, both forward link and reverse link transmissions occur to enable a overlap bandwidth subscriber unit to derive a reverse link symbol timing reference. A preferred embodiment of a closed-loop approach is timing advance, hereafter referred to as closed-loop timing advance to emphasize the closed-loop aspect. In closed-loop timing advance, an overlap bandwidth subscriber unit transmits a reverse link signal to the base unit. The base unit measures a symbol time offset in the received reverse link signal. The symbol time offset is the difference in time between the symbol timing of the received reverse link signal and a base unit reference expected received signal symbol timing. The base unit calculates a time advance value which needs to be introduced in the overlap bandwidth subscriber unit symbol time reference to eliminate the symbol time offset. The time advance value is typically equal to the measured symbol time offset. The base unit then transmits the time advance value to the overlap bandwidth subscriber unit on the forward link. The overlap bandwidth subscriber unit receives the time advance value and adjusts its transmit symbol time reference by the received time advance value. The adjusted transmit symbol time reference is used to determine the symbol timing of subsequent reverse link transmissions.

To satisfy the frequency reference requirement in the overlap bandwidth subscriber units, each overlap bandwidth subscriber unit must derive a frequency reference from the forward link signal transmitted by the base unit. In a preferred embodiment, the forward link signal contains known data portions which are periodically transmitted. The overlap bandwidth subscriber unit receives the forward link signal and uses the known data portions to derive an accurate frequency reference which is effectively locked to the base unit frequency reference. Suitable methods for deriving the frequency reference in a overlap bandwidth subscriber unit, such as automatic frequency control are known in the art.

The present invention can be more fully described with reference to FIG. 3, numeral 300. FIG. 3 illustrates a multiple-user two-way wireless communication system 300 in accordance with the present invention. A service access point is provided by base unit 310. Base unit 310 provides simultaneous service to a plurality of overlap bandwidth subscriber units, including, but not limited to, overlap bandwidth subscriber units 320 and 330. In a preferred embodiment, base unit 310 also provides connectivity to another network such as the PSTN 340. The communication link from base unit 310 to an overlap bandwidth subscriber unit will hereafter be referred to as a forward link. The communication link from a overlap bandwidth subscriber unit to base unit 310 will hereafter be referred to as a reverse link.

In a preferred embodiment, the forward link signal transmitted by base unit 310 includes an OFDM signal. Under this preferred embodiment, a data stream is fed into base unit 310 from the PSTN 340. Within base unit 310, the data stream is separated into a number of parallel lower data rate streams, each of which modulates a separate data carrier signal using OFDM. In a preferred embodiment, this modulation is done digitally using an Inverse Fast Fourier Transform, hereafter referred to as an IFFT. In an alternate embodiment, this modulation may be done in an analog fashion. Base unit 310 receives a composite signal comprising a plurality of reverse link signals from overlap bandwidth subscriber units and detects the reverse link signal of each overlap bandwidth subscriber unit. In the present invention, the demodulation/detection of the reverse link signals may be implemented with an OFDM demodulator/detector.

In the embodiment of FIG. 3, numeral 300, a plurality of overlap bandwidth subscriber units includes the two overlap bandwidth subscriber units 320 and 330. However, the invention is fully applicable to systems containing a larger number of overlap bandwidth subscriber units. A plurality of overlap bandwidth subscriber units receive the forward link signal, and each derives a frequency reference from the forward link signal. Each overlap bandwidth subscriber unit preferably derives the frequency reference from the forward link signal using an automatic frequency control, as is known in the art. Each overlap bandwidth subscriber unit also derives a symbol timing reference from the forward link signal, as described earlier.

A plurality of overlap bandwidth subscriber units transmit reverse link signals to the base unit simultaneously with a symbol timing based on the symbol timing reference derived from the forward link signal, and with the spectra of the plurality of reverse link signals overlapping. Each reverse link signal includes one or more modulated data carrier signals.

In a preferred embodiment, the carrier frequencies for the reverse link modulated data carriers are selected from a set of allowable reverse link carrier frequencies. The set of allowable carrier frequencies is affected by factors including the system frequency band allocation and the bandwidth available in the system for reverse link transmissions. The set of allowable reverse link carrier frequencies are spaced by integer multiples of $1/t_s$, where $t_s$ is the reverse link useful symbol duration. The set of spaced carrier frequencies form a carrier frequency "grid". The values of the grid of carrier frequencies are preferably predetermined and are stored and labeled in the base unit and overlap bandwidth subscriber unit.

The accuracy of the carrier frequencies of the reverse link modulated data carrier signals is dependent on the accuracy of the frequency reference of the overlap bandwidth subscriber unit. The accuracy of the overlap bandwidth subscriber unit frequency reference generally depends on the accuracy of a local oscillator in the overlap bandwidth subscriber unit. Inaccuracies in the local oscillator are preferably eliminated by deriving a frequency reference from the forward link signal using automatic frequency control, as described earlier. Since a frequency reference is derived from the forward link signal, the carrier frequencies of the modulated data carriers generated by the overlap bandwidth subscriber unit will coincide with elements of the carrier frequency grid in the base unit.

The specific carrier frequencies used by a particular overlap bandwidth subscriber unit for its reverse link modulated data carriers may be determined in a number of ways. In a preferred embodiment, the base unit includes in the transmitted forward link signal, a list of reverse link carrier frequencies from the set of allowable reverse link carrier frequencies which are available (i.e., carrier frequencies which are not currently being used by an overlap bandwidth subscriber unit). The overlap bandwidth subscriber unit selects reverse link carrier frequencies from the list for its reverse link modulated data carriers. The carrier frequencies used by separate overlap bandwidth subscriber units for reverse link transmissions are distinct to avoid directly coincident signal spectra from separate overlap bandwidth subscriber units.

If the overlap bandwidth subscriber unit reverse link signal includes a plurality of modulated data carriers, the plurality of modulated data carriers is at least in part preferably generated digitally using an Inverse Discrete Fourier Transform (IDFT), as is known in the art. The IDFT may be efficiently implemented using the Inverse Fast Fourier Transform, as is known in the art.

In another preferred embodiment of the present invention, the overlap bandwidth subscriber units further include a cyclic extension portion in the pulse shape function of the modulated data carrier signals. Referring to the equations derived earlier, it can be shown that a cyclic extension portion duration of $\Delta t_s$ eliminates mutual interference in reverse link signals when the symbol timing of the received reverse link signals at the base unit is different up to a maximum value of $\Delta t_s$. Thus, a cyclic extension enables mutual interference to be avoided even when there are moderate inaccuracies in the symbol time references of the overlap bandwidth subscriber units.

Another preferred embodiment of the present invention includes the use of reverse link power control. As described earlier, if the symbol time reference and frequency reference of each overlap bandwidth subscriber unit are controlled appropriately, then mutual interference among the overlap bandwidth subscriber units transmitting reverse link may be avoided. If, however, the time and frequency references of the overlap bandwidth subscriber units are not controlled properly, then mutual interference will occur. In this case, as the previous equations indicate, the amount of interference is responsive to the relative amplitudes of the reverse link signals. The amount of interference will increase significantly if some overlap bandwidth subscriber unit reverse link signals arrive at the base unit with substantially larger amplitude than other overlap bandwidth subscriber unit reverse link signals. Therefore, reverse link power control is useful to limit the interference level in the case of parameter mismatches. Reverse link power control methods are known in the art. In a preferred reverse link power control method, the overlap bandwidth subscriber unit adjusts the reverse link transmit power in accordance with a predetermined reference reverse link expected received power of the base unit. In this approach the base unit compares a received reverse link signal power to a desired reverse link signal power. If the received power is not substantially close to the desired power, the base unit determines whether the overlap bandwidth subscriber unit transmit power needs to be increased or decreased to bring the received power closer to the desired power. Using the forward link, the base unit sends a power increase or power decrease message to the overlap bandwidth subscriber unit according to whether the received power was less than or greater than the desired power, respectively.

Referring to FIG. 3, overlap bandwidth subscriber unit 320 will be further described. The overlap bandwidth subscriber unit 320 includes a receiver 326, an overlap bandwidth transmitter 325, a frequency reference derivation unit 322, and a symbol time reference derivation unit 321. Receiver 326 and overlap bandwidth transmitter 325 are operably coupled to an antenna for wireless communication. In an alternate embodiment comprising a wired communication system, the overlap bandwidth transmitter and receiver are operably coupled to the communication system wiring infrastructure.

Receiver 326 is used for receiving a forward link signal which has been transmitted by base unit 310. Receiver 326 preferably filters, amplifies, and downconverts the received signal. Receiver 326 also preferably converts the received signal to digital form and detects the information contained in the received signal. The forward link signal preferably includes an OFDM signal, and the detection is preferably based on a Discrete Fourier Transform (DFT), which may be efficiently implemented with a Fast Fourier Transform (FFT), as is known in the art.

Overlap bandwidth transmitter 325 is used for transmitting a reverse link signal to base unit 310. The transmitted reverse link signal includes one or more modulated data carrier signals having distinct carrier frequencies. Preferred methods for determining the carrier frequencies for the modulated data carrier signals were described earlier. If the overlap bandwidth subscriber unit reverse link signal includes a plurality of modulated data carriers, the plurality of modulated data carriers is at least in part preferably generated digitally using an Inverse Discrete Fourier Transform (IDFT), as is known in the art. The IDFT can be efficiently implemented using the Inverse Fast Fourier Transform, as is known in the art. Overlap bandwidth transmitter 325 preferably converts the digital form of the sum of the modulated data carriers to an analog signal, filters, upconverts, and amplifies the signal for transmission. The spectrum of the reverse link signal extends into regions of the frequency band which may be used by other overlap bandwidth subscriber units such as overlap bandwidth subscriber unit 330, in a similar fashion to what was illustrated in FIG. 1. Even though the spectrum of the reverse link signal extends into regions of the frequency band which may be used by other overlap bandwidth subscriber units, overlap bandwidth subscriber unit 320 does not interfere with other reverse link communications, as the previous equations indicate.

Frequency reference derivation unit 322 derives a frequency reference from the received forward link signal, and determines a carrier frequency for one or more modulated data carrier signals for the reverse link signal based in part on the derived frequency reference. In a preferred embodiment, the forward link signal contains known data portions which are periodically transmitted. The overlap bandwidth subscriber unit receives the forward link signal and uses the known data portions to derive an accurate frequency reference which is effectively locked to the base unit frequency reference. Suitable methods for deriving the frequency reference in a overlap bandwidth subscriber unit, such as automatic frequency control are known in the art. A preferred method for determining the carrier frequencies for the reverse link signal by selecting carrier frequencies from a set of allowable reverse link carrier frequencies was described earlier.

In another preferred embodiment, base unit 310 measures a frequency offset in the reverse link signal and sends a frequency adjust message to the subscriber unit on the forward link. Symbol time reference derivation unit 321 derives a symbol timing reference from the forward link signal, and adjusts the symbol timing of the reverse link transmitted signal responsive to the derived symbol timing reference. As described earlier, the symbol timing reference can be derived with an open-loop or a closed-loop method.

In a preferred open-loop approach, the overlap bandwidth subscriber unit derives a reverse link symbol timing reference from the symbol timing of the received forward link signal. In demodulating the received forward link signal, the overlap bandwidth subscriber unit determines the symbol timing of the received forward link signal using one of the symbol timing recovery methods known in the art. The symbol timing reference derived from the symbol timing of the received forward link signal is then used as a symbol timing reference for the transmission of a reverse link signal by the overlap bandwidth subscriber unit. The overlap bandwidth subscriber unit may optionally advance the symbol timing reference of the reverse link by an amount equal to the signal delay introduced by analog and digital processing chains in the overlap bandwidth subscriber unit transmitter and receiver.

Open-loop symbol time reference methods are typically appropriate for geographically small two-way communication systems where propagation delays within the system coverage area are negligible. In order to be considered negligible, the propagation delay must be much smaller than $t_s$, for example less than 1% of $t_s$.

A preferred embodiment of a closed-loop time reference derivation method is timing advance, hereinafter referred to as closed-loop timing advance to emphasize the closed-loop aspect. In closed-loop timing advance, a overlap bandwidth subscriber unit transmits a reverse link signal to the base unit. The base unit measures a symbol time offset in the received reverse link signal. The symbol time offset is the difference in time between the symbol timing of the received reverse link signal and a base unit reference expected received signal symbol timing. The base unit calculates a time advance value which needs to be introduced in the overlap bandwidth subscriber unit symbol timing to eliminate the symbol time offset. The time advance value is typically equal to the measured symbol time offset. The base unit then transmits the time advance value to the overlap bandwidth subscriber unit on the forward link. The overlap bandwidth subscriber unit receives the time advance value and the symbol time reference derivation unit 321 adjusts the symbol timing of subsequent reverse link transmitted signals by the received time advance value.

In another preferred embodiment, subscriber unit 320 additionally includes a cyclic extension unit 324. Cyclic extension unit 324 is used for extending the duration of the data symbols which modulate the modulated data carriers for the reverse link signal. The extended symbol includes a useful symbol portion and a symbol extension portion, as defined earlier. In a preferred embodiment, the overlap bandwidth subscriber unit reverse link signal includes a plurality of modulated data carriers, with the plurality of modulated data carriers preferably generated digitally using an Inverse Discrete Fourier Transform (IDFT), which can be efficiently implemented using the Inverse Fast Fourier Transform, as is known in the art. A preferred embodiment of cyclic extension unit 324 generates the symbol extension portion for the group of modulated data carriers by first duplicating a portion of the IDFT output vector and then appending the duplicated vector portion to the original IDFT output vector, as is known in the art.

Referring to the equations derived earlier, it can be shown that a cyclic extension portion duration of $\Delta t_s$ eliminates mutual interference in reverse link signals when the symbol timing of the received reverse link signals at the base unit is different up to a maximum value of $\Delta t_s$. Thus, a cyclic extension enables mutual interference to be avoided even when there are moderate inaccuracies in the symbol time references of the overlap bandwidth subscriber units. However, as is known in the art, a cyclic extension reduces the system bandwidth efficiency in proportion to the duration of the cyclic extension, so the cyclic extension portion should be made only as large as necessary.

In another preferred embodiment, subscriber unit 320 additionally includes a power control unit 323 for adjusting a transmit power of the reverse link signal in accordance with a predetermined reference reverse link expected received power of the base unit. The base unit compares a received reverse link signal power to a desired reverse link signal power. If the received power is not close to the desired power, the base unit determines whether the overlap bandwidth subscriber unit transmit power needs to be increased or decreased to bring the received power closer to the desired power. Using the forward link, the base unit sends a power increase or power decrease message to the overlap bandwidth subscriber unit according to whether the received power was less than or greater than the desired power, respectively. The power control unit then adjusts the reverse link transmit power on subsequent reverse link transmissions in response to the power adjust message.

Figure 4:
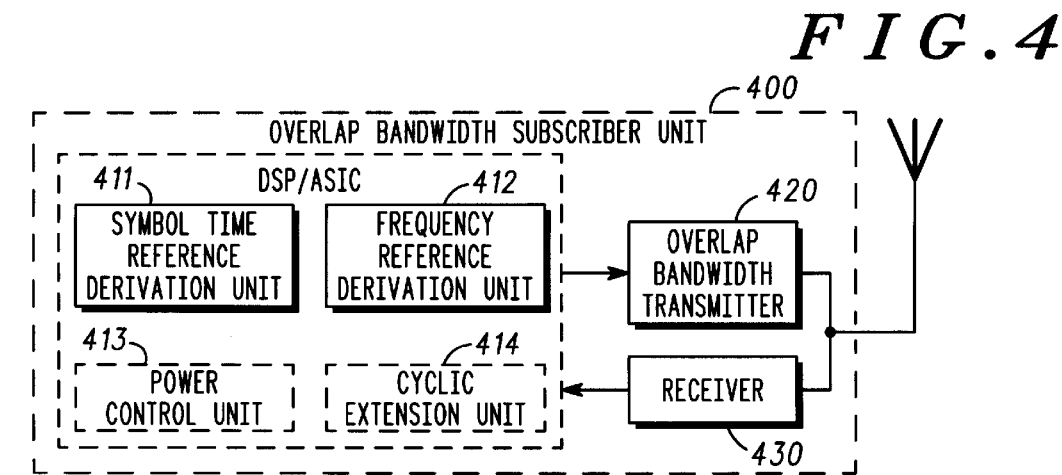
FIG. 4 is a schematic illustrating an overlap bandwidth subscriber unit containing a digital signal processor/application specific integrated circuit in accordance with the present invention.

Note that symbol time reference derivation unit 321, frequency reference derivation unit 322, power control unit 323, and cyclic extension unit 324 may be implemented within hardware, or within a combination of software and hardware, as indicated in FIG. 4, numeral 400. A hardware implementation preferably includes an Application Specific Integrated Circuit (ASIC). A combined software/hardware implementation preferably includes a Digital Signal Processor (DSP) executing a stored program.

Turning now to the base unit 310 of FIG. 3, the base unit 310 includes a transmitter 315 for transmitting a forward link signal, a receiver 316 for receiving a composite signal for a plurality of reverse link signals from overlap bandwidth subscriber units including, but not limited to overlap bandwidth subscriber units 320 and 330, and an overlapped signal spectra detector 314, for detecting a transmit signal from each of a plurality of overlap bandwidth subscriber units, to facilitate communication using overlapped transmit signal spectra of at least two overlap bandwidth subscriber units.

Receiver 316 preferably filters, amplifies, and downconverts the composite received signal. Receiver 316 also preferably converts the received signal to digital form with an analog to digital converter and passes the digital form signal to overlapped signal spectra detector 314. Overlapped signal spectra detector 314 detects and separates the individual reverse link signals from the composite received signal comprising a plurality of reverse link signals prior to passing the detected reverse link signals to the public switched telephone network 340. Detection of the individual reverse link signals from the composite received signal is preferably based on a discrete Fourier Transform (DFT), which may be efficiently implemented using a Fast Fourier Transform (FFT), as is known in the art.

Another preferred embodiment of base/headend unit 310 includes a received symbol timing offset calculator 311 for measuring a symbol timing offset of a received reverse link signal transmitted by an overlap bandwidth subscriber unit, and for generating a symbol timing reference adjustment value to be transmitted to the subscriber unit on the forward link.

Another preferred embodiment of base unit 310 includes a power measurement control unit 313 for measuring a signal power of a received reverse link signal transmitted by an overlap bandwidth subscriber unit, for comparing the signal power to an expected signal power, and for generating a reverse link transmit power adjustment value to be transmitted to the subscriber unit on the forward link. Another preferred embodiment of base unit 310 includes a frequency offset measurement unit 312 for measuring a frequency offset of a received reverse link signal transmitted by an overlap bandwidth subscriber unit, and for generating a reverse link frequency reference adjustment value to be transmitted to the subscriber unit on the forward link.

We claim:

1. A bandwidth efficient multiple user digital communication system which facilitates multiple user reverse link communication using overlapped transmit signal spectra of at least two overlap bandwidth subscriber units, comprising:

A) a base/headend unit, for transmitting a forward link signal and receiving a composite signal consisting of a plurality of signals from a plurality of overlap bandwidth subscriber units and detecting a transmit signal from each of the plurality of overlap bandwidth subscriber units, wherein each transmit signal is transmitted to arrive at the base/headend unit substantially simultaneously;

B) the plurality of overlap bandwidth subscriber units, for receiving the forward link signal, each deriving a frequency reference based on at least the forward link signal, and each deriving a symbol timing reference based on at least the forward link signal, the plurality of overlap bandwidth subscriber units each transmitting a reverse link signal to the base/headend unit that receives a composite reverse link signal of the reverse link signals, each reverse link signal comprising at least one modulated data carrier, with each reverse link signal having distinct carrier frequencies, and each transmitted reverse link signal having a symbol timing responsive to the symbol timing reference, and with the frequency spectra of the reverse link signals overlapping.

2. The bandwidth efficient multiple user digital communication system of claim 1 wherein the frequency reference is derived from a carrier frequency of the forward link signal using automatic frequency control.

3. The bandwidth efficient multiple user digital communication system of claim 1 further including, in the overlap bandwidth subscriber unit, a symbol cyclic extension unit for extending a symbol time duration of the reverse link signal.

4. The bandwidth efficient multiple user digital communication system of claim 1 wherein the symbol timing reference is derived from a symbol timing of the forward link signal.

5. The bandwidth efficient multiple user digital communication system of claim 1 wherein the symbol timing reference is derived from closed-loop timing advance, and a subscriber unit transceiver includes a timing advance unit for, when transmitting, adjusting a transmit time of the reverse link signal for the subscriber unit in accordance with a time base reference of the base unit/headend transceiver.

6. The bandwidth efficient multiple user digital communication system of claim 1 wherein each overlap bandwidth subscriber unit includes a power control unit for adjusting a transmit power of the reverse link signal in accordance with a predetermined reference reverse link expected received power of the base/headend unit.

7. The bandwidth efficient multiple user digital communication system of claim 1 wherein the frequency reference is derived based on a frequency correction message in the forward link signal.

8. An overlap bandwidth subscriber unit in a bandwidth efficient multiple user digital communication system wherein a base/headend unit transmits a forward link signal and receives a composite signal for a plurality of signals from a plurality of overlap bandwidth subscriber units, wherein each of the plurality of signals is transmitted by one of the plurality of overlap bandwidth subscriber units to arrive at the base/headend unit substantially simultaneously and detects a transmit signal from each of a plurality of overlap bandwidth subscriber units, and wherein the overlap bandwidth subscriber unit receives the forward link signal, the overlap bandwidth subscriber unit wherein the overlap bandwidth subscriber unit facilitates multiple user reverse link communication using overlapped transmit signal spectra of at least two overlap bandwidth subscriber units the overlap bandwidth subscriber unit comprising:

A) a receiver, for receiving the forward link signal;

B) an overlap bandwidth transmitter, coupled to a frequency reference derivation unit, and a symbol time reference derivation unit, for transmitting a reverse link signal comprising at least one modulated data carrier signal, with the reverse link signal spectrum overlapping frequencies near a carrier frequency distinct from the carrier frequencies used for modulated data carriers in the reverse link signal;

C) the frequency reference derivation unit, coupled to the receiver, for generating a derived frequency reference based on at least the forward link signal, and for determining a carrier frequency for at least one modulated data carrier signal for a reverse link signal based in part on the derived frequency reference; and D) the symbol time reference derivation unit, coupled to the receiver and the frequency reference derivation unit, for deriving a symbol timing reference based on at least the forward link signal, and for adjusting a symbol timing of the reverse link transmitted signal responsive to the derived symbol timing reference.

9. The overlap bandwidth subscriber unit of the bandwidth efficient multiple user digital communication system of claim 8 wherein the frequency reference derivation unit derives the reference frequency from a carrier frequency of the forward link signal using automatic frequency control.

10. The overlap bandwidth subscriber unit of the bandwidth efficient multiple user digital communication system of claim 8 further including, in the overlap bandwidth subscriber unit, a symbol cyclic extension unit for extending a symbol time duration of the reverse link signal.

11. The overlap bandwidth subscriber unit of the bandwidth efficient multiple user digital communication system of claim 8 wherein the symbol timing reference derivation unit derives a symbol timing reference from a symbol timing of the forward link signal.

12. The overlap bandwidth subscriber unit of the bandwidth efficient multiple user digital communication system of claim 8 wherein the symbol timing reference derivation unit derives a symbol timing reference from closed-loop timing advance.

13. The overlap bandwidth subscriber unit of the bandwidth efficient multiple user digital communication system of claim 8 wherein the overlap bandwidth subscriber unit includes a power control unit for adjusting a transmit power of the reverse link signal in accordance with a predetermined reference reverse link expected received power of the base/headend unit.

14. A base/headend unit of a bandwidth efficient multiple user digital communication system that includes a plurality of overlap bandwidth subscriber units that receive a forward link signal, derive a frequency reference from the forward link signal, and each transmitting a reverse link signal comprising at least one modulated data carrier, with each reverse link signal having distinct carrier frequencies, and each transmitted reverse link signal having a symbol timing based at least in part on a symbol timing reference, and with the spectra of the reverse link signals overlapping, to the base/headend unit, wherein the base/headend unit facilitates communication using overlapped transmit signal spectra of a plurality of signals transmitted by at least two overlap bandwidth subscriber units, wherein each of the plurality of signals is transmitted by one of the plurality of overlap bandwidth subscriber units to arrive at the base/headend unit substantially simultaneously, the base/headend unit comprising:

A) a transmitter, operably coupled to the overlapped transmit signal spectra detector, for transmitting a forward link signal;

B) a receiver, for receiving a composite signal for a plurality of reverse link signals from overlap bandwidth subscriber units; and C) the overlapped transmit signal spectra detector, coupled to the receiver, for detecting a transmit signal from each of a plurality of overlap bandwidth subscriber units.

15. The base/headend unit of the bandwidth efficient multiple user digital communication system of claim 14 further including, in the overlap bandwidth subscriber unit, a symbol cyclic extension unit for extending a symbol time duration of the reverse link signal.

16. The base/headend unit of the bandwidth efficient multiple user digital communication system of claim 14 further including a received symbol timing offset calculator, for measuring a symbol timing offset of a received reverse link signal transmitted by an overlap bandwidth subscriber unit, and for generating a symbol timing reference adjustment value to be transmitted to the subscriber unit on the forward link.

17. The base/headend unit of the bandwidth efficient multiple user digital communication system of claim 14 wherein the overlap bandwidth subscriber unit symbol timing reference derivation unit derives a symbol timing reference from closed-loop timing advance.

18. The base/headend unit of the bandwidth efficient multiple user digital communication system of claim 14 further including a power measurement control unit, for measuring a signal power of a received reverse link signal transmitted by an overlap bandwidth subscriber unit, and for comparing the signal power to an expected signal power, and for generating a reverse link transmit power adjustment value to be transmitted to the subscriber unit on the forward link.

19. The base/headend unit of the bandwidth efficient multiple user digital communication system of claim 14 further including a frequency offset measurement unit, for measuring a frequency offset of a received reverse link signal transmitted by an overlap bandwidth subscriber unit, and for generating a reverse link frequency reference adjustment value to be transmitted to the subscriber unit on the forward link.

20. A digital signal processor/application specific integrated circuit for an overlap bandwidth subscriber unit in a bandwidth efficient multiple user digital communication system wherein a base/headend unit transmits a forward link signal and receives a composite signal for a plurality of signals from a plurality of overlap bandwidth subscriber units, wherein each of the plurality of signals is transmitted by one of the plurality of overlap bandwidth subscriber units to arrive at the base/headend unit substantially simultaneously and detects a transmit signal from each of a plurality of overlap bandwidth subscriber units, and wherein the overlap bandwidth subscriber unit receives the forward link signal, wherein the digital signal processor/application specific integrated circuit facilitates communication using overlapped transmit signal spectra of signals by at least two overlap bandwidth subscriber units, the digital signal processor/application specific integrated circuit comprising:

A) a frequency reference derivation unit, coupled to a receiver, for generating a derived frequency reference based on at least the forward link signal, and for determining a carrier frequency for at least one modulated data carrier signal for a reverse link signal comprising at least one modulated data carrier signal, with the reverse link signal spectrum overlapping frequencies near a carrier frequency distinct from the carrier frequencies used for modulated data carriers in the reverse link signal based in part on the derived frequency reference; and B) a symbol time reference derivation unit, coupled to the receiver, for deriving a symbol timing reference based on at least the forward link signal, and for adjusting a symbol timing of the reverse link transmitted signal responsive to the derived symbol timing reference.

21. The digital signal processor/application specific integrated circuit for overlap bandwidth subscriber unit of the bandwidth efficient multiple user digital communication system of claim 20 wherein the frequency reference derivation unit derives the reference frequency from a carrier frequency of the forward link signal using automatic frequency control.

22. The digital signal processor/application specific integrated circuit for overlap bandwidth subscriber unit of the bandwidth efficient multiple user digital communication system of claim 20 further including, in the overlap bandwidth subscriber unit, a symbol cyclic extension unit for extending a symbol time duration of the reverse link signal.

23. The digital signal processor/application specific integrated circuit for overlap bandwidth subscriber unit of the bandwidth efficient multiple user digital communication system of claim 20 wherein the symbol timing reference derivation unit derives a symbol timing reference from a symbol timing of the forward link signal.

24. The digital signal processor/application specific integrated circuit for overlap bandwidth subscriber unit of the bandwidth efficient multiple user digital communication system of claim 20 wherein the symbol timing reference derivation unit derives a symbol timing reference from closed-loop timing advance.

25. The digital signal processor/application specific integrated circuit for overlap bandwidth subscriber unit of the bandwidth efficient multiple user digital communication system of claim 20 wherein the overlap bandwidth subscriber unit includes a power control unit for adjusting a transmit power of the reverse link signal in accordance with a predetermined reference reverse link expected received power of the base/headend unit.

26. A method for providing bandwidth efficient multiple user digital communication in an overlap bandwidth subscriber unit wherein a base/headend unit transmits a forward link signal and receives a composite signal for a plurality of signals from a plurality of overlap bandwidth subscriber units, wherein each of the plurality of signals is transmitted by one of the plurality of overlap bandwidth subscriber units to arrive at the base/headend unit substantially simultaneously and detects a transmit signal from each of a plurality of overlap bandwidth subscriber units, and wherein the overlap bandwidth subscriber unit receives the forward link signal, wherein the method facilitates multiple user reverse link communication using overlapped transmit signal spectra of at least two overlap bandwidth subscriber units, the method comprising the steps of:

A) receiving the forward link signal;

B) transmitting a reverse link signal comprising at least one modulated data carrier signal, with the reverse link signal spectrum overlapping frequencies near a carrier frequency distinct from the carrier frequencies used for modulated data carriers in the reverse link signal;

C) generating a derived frequency reference based on at least the forward link signal, and for determining a carrier frequency for at least one modulated data carrier signal for a reverse link signal based in part on the derived frequency reference; and D) deriving a symbol timing reference based on at least the forward link signal, and for adjusting a symbol timing of the reverse link transmitted signal responsive to the derived symbol timing reference.

27. The method of claim 26 wherein the frequency reference is derived from a carrier frequency of the forward link signal using automatic frequency control.

28. The method of claim 26 further including a use of, in the overlap bandwidth subscriber unit, a symbol cyclic extension for extending a symbol time duration of the reverse link signal.

29. The method of claim 26 wherein the symbol timing reference is derived from a symbol timing reference from a symbol timing of the forward link signal.

30. The method of claim 26 wherein the symbol timing reference is derived from closed-loop timing advance.

31. The method of claim 26 further including power control for adjusting a transmit power of the reverse link signal in accordance with a predetermined reference reverse link expected received power of the base/headend unit.

* * * * *